United States Patent [19]

Sato

[11] 3,738,246
[45] June 12, 1973

[54] MIRROR SHOCK ABSORBER DEVICE FOR A CAMERA HAVING A QUICK RETURN MIRROR
[75] Inventor: Akihiko Sato, Tokyo, Japan
[73] Assignee: Nippon Kogaku K.K., Tokyo, Japan
[22] Filed: July 12, 1972
[21] Appl. No.: 271,192

[30] Foreign Application Priority Data
July 15, 1971 Japan..........................46/62212

[52] U.S. Cl. ............................................... 95/42
[51] Int. Cl. .......................................... G03b 19/12
[58] Field of Search .......................................... 95/42

[56] References Cited
UNITED STATES PATENTS
3,653,311  4/1972  Sato...................................... 95/42

Primary Examiner—Samuel S. Matthews
Assistant Examiner—Michael D. Harris
Attorney—Joseph M. Fitzpatrick, John Thomas Cella, Charles B. Cannon et al.

[57] ABSTRACT

A mirror shock absorber device for use in a camera having a quick return mirror comprises limit means rotatably journalled to the body of the camera for defining a predetermined lowermost position of the mirror. A rotatable member 14 is loosely fitted coaxially with the limit means and a fixed cylinder 11 formed with a circumferential portion 11a is fixed to the body of the camera. A retainer member 15 rotatably journalled to the rotatable member has one end thereof engageable with the limit means and the other end engageable with the circumferential portion of the fixed cylinder and frictionally slidable on such portion. A return spring for biasing the limit means into a position for defining the predetermined lowermost position of the mirror is provided between the retainer member and the camera body. The downward force of the mirror may be adsorbed by the sliding friction between the other end of the retainer member and the circumferential portion of the fixed cylinder.

5 Claims, 3 Drawing Figures

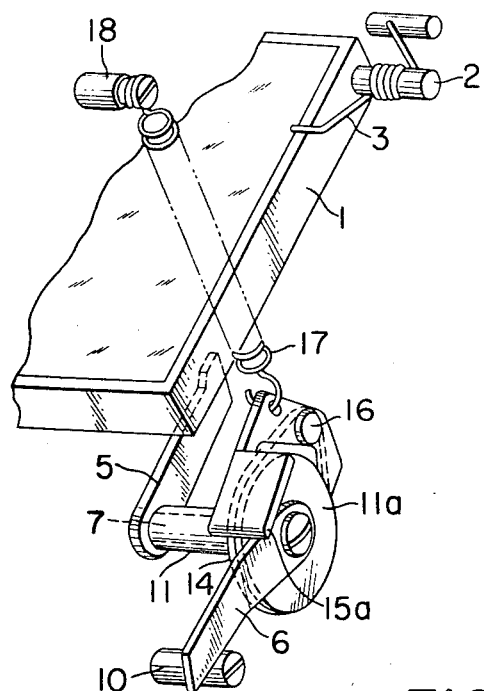
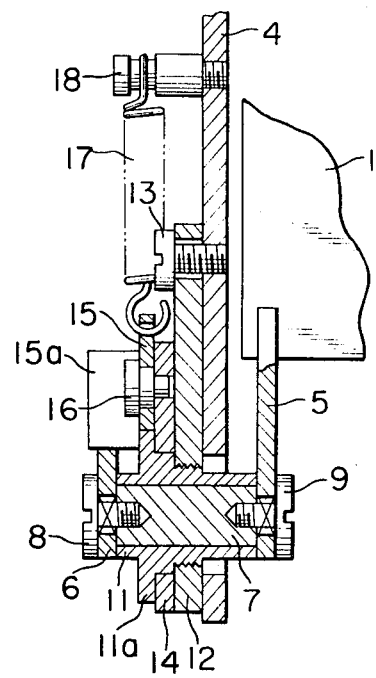
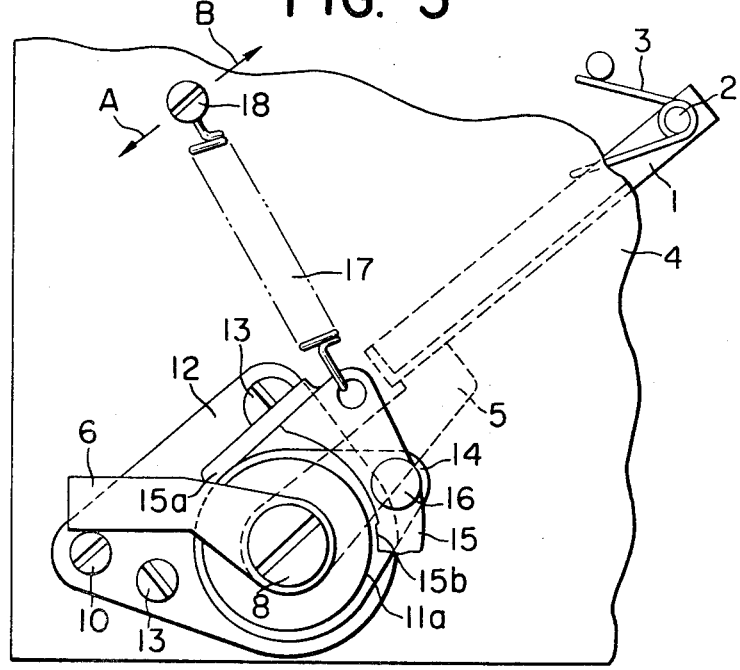

MIRROR SHOCK ABSORBER DEVICE FOR A CAMERA HAVING A QUICK RETURN MIRROR

BACKGROUND OF THE INVENTION

1. Field of the Invention

This invention relates to improvements in a mirror shock absorber device for use in a camera having a quick-return mirror.

2. Description of the Prior Art

There have heretofore been proposed, for use in cameras, various types of mirror shock absorber devices in which the shock produced during the downward movement of mirror is absorbed as by causing the mirror to strike against spring means. The devices using such means, however, have proven undesirable because the downward force of the mirror and the resiliency of the spring cause the mirror to bounce, with the result that the field of view is unstable with a flickering image appearing in the viewfinder. Moreover, the sound produced by such bouncing of the mirror is unpleasant.

To overcome these disadvantages, there is known a mirror shock absorber device which employs a slide spring of the free wheel clutch type so that the downward force of the mirror may be absorbed by the sliding frictional force of the slide spring acting in a direction for tightening the shaft of the wheel, and which also employs a return spring for holding the mirror at its predetermined lowermost position (i.e., the position in which the mirror is downwardly inclined at an angle of about 45° with respect to the horizontal plane). As regards the slide spring of this type, the free wheel clutch is such that the spring action depends on the direction of rotation of the free wheel clutch. More specifically, as the free wheel is rotated in the same direction as the turn of the spring, the spring is gradually tightened with respect to the shaft until the spring is integral with the shaft. When the free wheel is rotated in the opposite direction, the spring and the shaft are only idled.

The slide spring of the free wheel clutch type employed with the shock absorber device is arranged so that rotation of the free wheel in the direction of the turn of the spring causes the spring to be gradually tightened, that a further force imparted to the free wheel causes a relative sliding movement between the spring and the shaft, and that rotation of the free wheel in the opposite direction causes the spring and shaft to be idly rotated in the same way as described above with respect to the free wheel clutch. In such a device, it is imperative that the return spring be provided with a sufficient return force to resist the sliding frictional force of the slide spring when the return spring acts to return the mirror to its predetermined lowermost position after the full downward force of the mirror has been absorbed by the sliding frictional force of the slide spring. This results in a disadvantage in that the return spring adds to the shock caused when the mirror is returned to its predetermined lowermost position. Furthermore, any possible manufacturing error in such device would lead to irregularity in the sliding frictional force of the slide spring, and therefore the spring force of the return spring must be selected with such irregularity taken into consideration. This will further aggravate the problem when such devices are to be produced on a mass production scale.

SUMMARY OF THE INVENTION

I have conceived apparatus of the class described by which I am able to overcome all the above-noted disadvantages existing in the mirror shock absorbers of the prior art.

Thus, my invention contemplates a mirror shock absorber device comprising a limit member for defining a predetermined lowermost position of the mirror, the limit member being rotatably journalled to the body of the camera. A rotatable member is loosely fitted coaxially with the limit member. A cylinder is fixed to the body of the camera and is formed with a circumferential portion projected radially outwardly of the cylinder; and a retainer member is rotatably journalled to the rotatable member and has one end thereof engageable with the limit member and the other end engageable with the circumferential portion of the fixed cylinder and frictionally slidable thereon. A return spring extends between the retainer member and the body of the camera to bias the limit member into a position for defining the predetermined lowermost position of the mirror. Thus, the downward force of the mirror may be absorbed by the sliding friction between the other end of the retainer member and the circumferential portion of the fixed cylinder.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification wherein:

FIG. 1 is a perspective view of the mirror shock absorber device according to an embodiment of the present invention;

FIG. 2 is a cross-sectional view of the same device; and

FIG. 3 is a side view of the device.

DESCRIPTION OF THE PREFERRED EMBODIMENTS

Referring to the drawings, a mirror 1 is pivotally mounted on a shaft 2 and biased downwardly by a spring 3 attached to the shaft 2. The shaft 2 is secured to a mirror box 4; and the mirror 1, shaft 2 and spring 3 together constitute the so-called quick-return mirror pivotable up and down, as viewed in FIG. 1, in response to a shutter release mechanism.

A lever 5 has one end thereof engageable with the mirror 1, and a lever 6 has one end thereof engageable with a positioning pin 10 studded in a base plate 12. The other ends of the levers 5 and 6 are secured to the opposite ends of a shaft 7 by means of screws 9 and 8, respectively, (FIG. 2). The shaft 7 is rotatably journalled to a fixed cylinder 11 which will later be described in further detail. The members 5, 6, 7, 8 and 9 together constitute a limit member for holding the mirror 1 at its predetermined lowermost position (i.e., the position in which the mirror is downwardly inclined at an angle of about 45° with respect to the horizontal plane).

The fixed cylinder 11 is formed with a circumferential portion 11a projected radially outwardly thereof and is fixed to the base plate 12 which, in turn, is secured to the mirror box 4 by means of screw 13. A member 14 is rotatably fitted on the fixed cylinder 11.

A retainer member 15 is rotatably journalled to the rotatable member 14 by means of shaft 16, and one end of the retainer member 15 is formed with a bent portion 15a engageable with the lever 6, while, as shown in FIG. 3, the other end is formed with an engaging portion 15b engageable with the circumferential portion 11a of the fixed cylinder 11 and is frictionally slidable thereon. A return spring 17 extends between and is secured to a spring holder pin 18 studded in the mirror box 4 and the aforesaid retainer member 15, so that the spring 17 may hold the mirror 1 at the predetermined lowermost position against the force of the spring 3 with the aid of the retainer member 15, limit members 5-9 and positioning pin 10. In this position, as shown in FIG. 3, the retainer member 15 provides a slight clearance between its engaging portion 15b and the circumferential position 11a of the fixed cylinder 11. Also, as shown in FIG. 3, the return spring 17 is arranged so that the biasing force thereof acts in a direction substantially perpendicular to the line passing through the centers of rotation of the shafts 7 and 16.

As will further be seen from FIG. 3, the more the spring holder pin 18 is moved in the direction of arrow A, the greater spring force or component will be developed to prevent clockwise rotation of the retainer member 15 about the shaft 16; and the more the spring holder pin 18 is moved in the direction of arrow B, the greater force or component will be developed to urge the engaging portion 15b of the retainer member 15 against the circumferential portion 11a of the fixed cylinder 11.

The return action of the return spring 17 may be varied if the direction of the biasing force imparted by the spring 17 is not substantially perpendicular to the aforesaid line passing through the centers of rotation of the shafts 7 and 16 (provided that the shaft 16 is positioned on the extension in the direction of the biasing force), but it will be apparent that such variation in the return action of the spring 17 will in no way hinder the principle of the present invention.

With such an arrangement, the mirror 1 is pivotally moved upwardly in response to shutter release and then moved downwardly to strike against the lever 5 and thus rotate the levers 5 and 6 clockwise with the downward force of the mirror. This, in turn, causes the retainer member 15, engaged with the lever 6, to be pivotally moved clockwise about the shaft 16, so that the engaging portion 15b is urged into contact with the circumferential portion 11a of the fixed cylinder 11 and frictionally slides on such portion 11a to thereby rotate the rotatable member 14 with the retainer member 15 about the fixed cylinder 11, thus frictionally absorbing the downward force of the mirror 1. When all the downward force of the mirror 1 has been absorbed, the return force of the return spring 17 imparts a counter-clockwise rotational force to the retainer member 15 about the shaft 16, thereby to release the engagement between the engaging portion 15b and the circumferential portion 11a and bring the bent portion 15a into engagement with the lever 6, thus rotating the retainer member 15, rotatable member 14 and levers 6 and 5 all together in counter-clockwise direction until the lever 6 is engaged with the positioning pin 10 to hold the mirror 1 at the predetermined lowermost position, i.e., at an angle of 45° with respect to the horizontal plane.

Thus, the present invention has advantages as will be described hereunder. The relative frictional sliding between the engaging portion 15b of the retainer member 15 and the circumferential portion 11a of the fixed cylinder 11 is utilized to absorb all the downward force of the mirror 1, whereafter when the return spring 17 is about to return the mirror 1 to its predetermined or 45°-inclined position, the engagement between the engaging portion 15b and the circumferential portion 11a is released without producing any relative friction therebetween, thus allowing the mirror 1 readily to be returned to its predetermined lowermost position with the aid of the retainer member 15 and levers 6, 5. This eliminates the need to increase the biasing force of the return spring in view of the sliding friction required to return the mirror in the previously-described mirror shock absorber of the conventional type which has employed a slide spring of the free wheel clutch type, and thus the spring force of the return spring 17 may be much smaller than in the conventional absorber device. The result is that the shock produced by the return of the mirror in the present system is negligible and would not provide any appreciable adverse effect.

In addition, the absorption of the shock imparted by the mirror 1 when moved downwardly is useful greatly to minimize the sound resulting from such shock as well as flickering of the viewfinder image attributable to the shock.

I believe that the construction and operation of my novel shock absorber device will be understood, and that its advantages will be fully appreciated by those persons skilled in the art.

I claim:

1. A mirror shock absorber device for use in a camera having a quick return mirror, said device comprising limit means rotatably journalled to the body of the camera for defining a predetermined lowermost position of said mirror, a rotatable member loosely carried by said limit means, means fixed to the body of the camera and formed with a circumferential portion projected radially outwardly thereof, a retainer member rotatably journalled to said rotatable member, said retainer member having one end thereof engageable with said limit means and the other end engageable with said circumferential portion of said fixed means and frictionally slidable thereon, and a return spring extending between said retainer member and the body of said camera for biasing said limit means into a position for defining said predetermined lowermost position of said mirror, whereby the downward force of said mirror may be absorbed by sliding friction between said other end of said retainer member and said circumferential portion of said fixed means.

2. A mirror shock absorber device according to claim 1, wherein said limit means comprise a lever having one end thereof engageable with said mirror, a lever having one end thereof engageable with a positioning pin studded in the body of said camera, a shaft fixed to said camera body said two levers being secured to said shaft at the opposite ends thereof by means of screws.

3. A mirror shock absorber device according to claim 2, wherein said return spring is disposed so that the spring action thereof works in a direction substantially perpendicular to a line passing through the centers of rotation of said shaft and said retainer member.

4. A mirror shock absorber device according to claim 2, wherein said predetermined lowermost position of said mirror is a position in which said mirror is downwardly inclined at an angle of about 45° with respect to the horizontal plane.

5. A mirror shock absorber device according to claim 2, wherein said means fixed to the body of the camera is a cylinder in which said shaft is journalled.

* * * * *